United States Patent [19]

Kato

[11] 4,322,609
[45] Mar. 30, 1982

[54] PEDOMETER ASSEMBLY
[75] Inventor: Yasuji Kato, Tokyo, Japan
[73] Assignee: Yamasa Tokei Meter Co., Ltd., Tokyo, Japan
[21] Appl. No.: 124,867
[22] Filed: Feb. 26, 1980
[30]   Foreign Application Priority Data
  Jan. 14, 1980 [JP]   Japan ............................ 55-2743[U]
[51] Int. Cl.³ ............................................ G01C 22/00
[52] U.S. Cl. ........................................ 235/105; 235/10
[58] Field of Search ............... 235/105, 78 R, 89 R, 235/118, 1 C, 119, 91 H, 95 C, 92 DN, 10

[56]     References Cited
         U.S. PATENT DOCUMENTS 2,724,552  11/1955  Sherwood ........................ 235/78R
3,474,958  10/1969  Meyer ............................. 235/1 C
3,818,194   6/1974  Biro ................................ 235/105

Primary Examiner—L. T. Hix
Assistant Examiner—Benjamin R. Fuller
Attorney, Agent, or Firm—Cantor and Singer

[57]     ABSTRACT

A pedometer assembly comprises a base disc, pendulum adapted to swing at every step and a display panel. This display panel is rotatably in response to swinging movement of the pendulum and is provided at its periphery with a cylindrical wall. The wall is scored or provided on its outer surface with graduation for indicating the number of repetitions. The surface of the display panel is provided with a proportional diagram adapted for use in the determination of the relation between the number of repetitions, the distance which has been run, and the amount of calories consumed.

5 Claims, 13 Drawing Figures

PEDOMETER ASSEMBLY

FIELD OF THE INVENTION

The present invention relates to a pedometer assembly adapted for use in various types of exercises, say, jogging, walking, heel-and-toe walking, marathon, rope skipping or the like.

SUMMARY OF THE INVENTION

Thus, a main object of the present invention is to provide a pedometer assembly which permits easy reading of the number of repetitions, e.g., the number of steps in jogging, walking, marathon or heel-and-toe walking or the number of skips in rope skipping, and the amount of exercises corresponding to said number, e.g., the distance which has been run and the amount of calories consumed.

According to the present invention, there is provided a pedometer assembly comprising a display panel rotatable in response to swinging movement of a pendulum, a cylindrical wall provided at the periphery of said panel, said wall being provided or scored on its outer surface with graduations for indicating the number of repetitions, a proportional diagram provided on the surface of said panel and adapted to indicate the relation between the number of repetitions and the amount of exercises corresponding thereto, a casing for accommodating therein the aforementioned parts, a viewing window for said graduations and a reference line which are provided on the upper part of said casing, and a viewing window for said proportional diagram and a reference line, graduations and figures for indicating the distance which has been run and/or the amount of calories consumed, which are provided in front of said casing.

BRIEF DESCRIPTION OF THE DRAWINGS

The present invention will now be elucidated with reference to the accompanying drawings, in which.

DETAILED DESCRIPTION OF THE INVENTION

Figure 1:
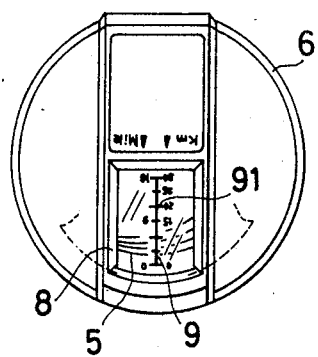
FIG. 1 is a front view of the exterior of a first embodiment of the pedometer assembly according to the present invention.
Figure 2:
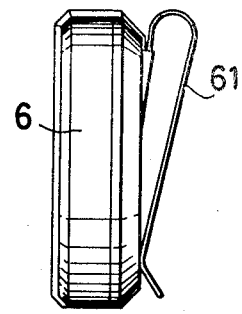
FIG. 2 is a side view of the same and FIG. 3 is a plan view of the same.
Figure 3:
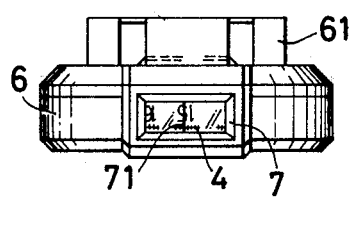
Figure 4:
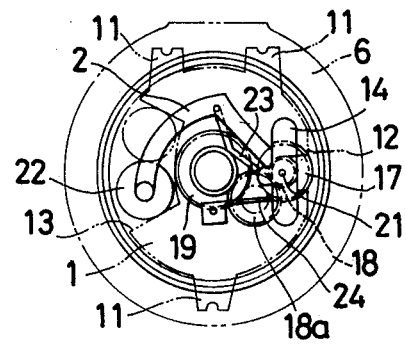
FIG. 4 is a front view of the interior of the first embodiment.
Figure 6:
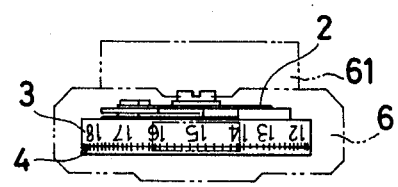
FIG. 6 is a plan view of the same and FIG. 7 is a cut away plan view of the same. A member 14 for supporting shaft 21 is mounted over notch 12.
Figure 5:
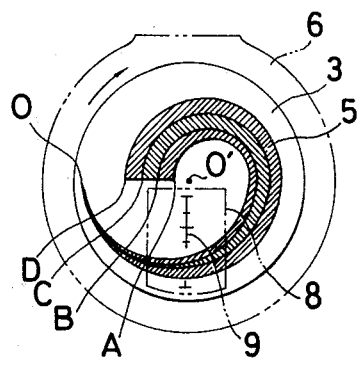
FIG. 5 is a front view of the display panel forming part of the first embodiment.
Figure 7:
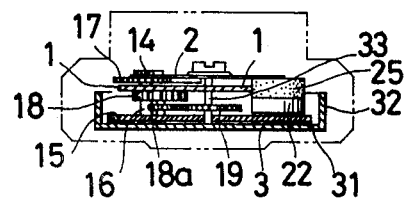

Referring now to FIGS. 1 to 9, there is shown a first embodiment of the pedometer assemblies according to the present invention, said embodiment being adapted to display the number of steps and the distance which has been run. More specifically, FIG. 1 is a front view of the exterior of the first embodiment, FIG. 2 is a side view of the same and FIG. 3 is a plan view of the same; FIG. 4 is a front view of the interior of the first embodiment; FIG. 5 is a front view of the display panel forming part of the first embodiment, FIG. 6 is a plan view of the same and FIG. 7 is a cut away plan view of the same. In these figures, reference numeral 1 stands for a base disc; 2 for a pendulum adapted to swing at every step, 3 for a display panel; 4 for graduations for indicating the number of steps and the distance, which are provided on the periphery of said panel; 5 for a proportional diagram showing the relation between the number of steps and the distance, which is provided in front of said panel; 6 for a casing for accommodating therein the aforesaid parts; 7 for a viewing window formed for said graduations in the upper portion of casing 6; 8 for a viewing window formed for said proportional diagram in front of casing 6; and 9 for a reference line provided for said diagram on viewing window 8.

The foregoing parts are constructed in the following manner. The base plate 1 is provided on its periphery with a plurality of supports 11 for supporting the same on casing 6, a notch 12 through which the shaft 21 of pendulum 2 passes and a notch 13 in which a weight 22 of pendulum 2 is movable. A member 14 for supporting shaft 21 is mounted over notch 12.

The base plate 1 is further supportably provided on its one side with a round plate 15 through a gap by means of a coupling member 16. The shaft 21 passing through notch 12 is set between round plate 15 and shaft-supporting member 14. On the shaft are rotatably supported the base of pendulum 2, a ratchet wheel 17 and a gear 18 in operable association therewith. The ratchet wheel 17 is then kept in engagement with a ratchet 23 extending from pendulum 2 and a check ratchet 24 extending from base disc 1. The ratchet 23 is designed such that, when pendulum 2 moves downwardly (in FIG. 4) at every step in jogging, walking, marathon or heel-and-toe walking, it forcedly turns ratchet wheel 17, and the check ratchet 24 is designed to prevent reversion of ratchet wheel 17. It should be noted that the weight 22 has a shock absorber 25 formed of e.g., rubber.

The display panel 3 comprises a circular flat plate 31 and a peripheral wall 32 in the cylindrical form, which defines together a space to accommodate therein round plate 15, weight 22 and the like. The wall 32 is provided on its outer surface with graduations 4 for indicating the number of repetitions, i.e., the number of steps, and the flat plate 31 is provided on its surface with a proportional diagram 5 showing the relation between the number of steps and the distance. The thus assembled panel 3 is rotatably supported at its center on a shaft 33.

The shaft 33 passing through the centers of base plate 1 and round plate 15 supports the panel 3 in front of round plate 15, and is provided with a gear 19, which is driven through a gear unit 18a in operable association with gear 18. This gear 19 permits rotation of the panel 3 in integral relation to shaft 33. Thus, rotation of ratchet wheel 17 effected by swinging movement of pendulum 2 causes the panel 3 to turn in response to gear 18, gear unit 18a, gear 19 and shaft 33.

Figure 8:
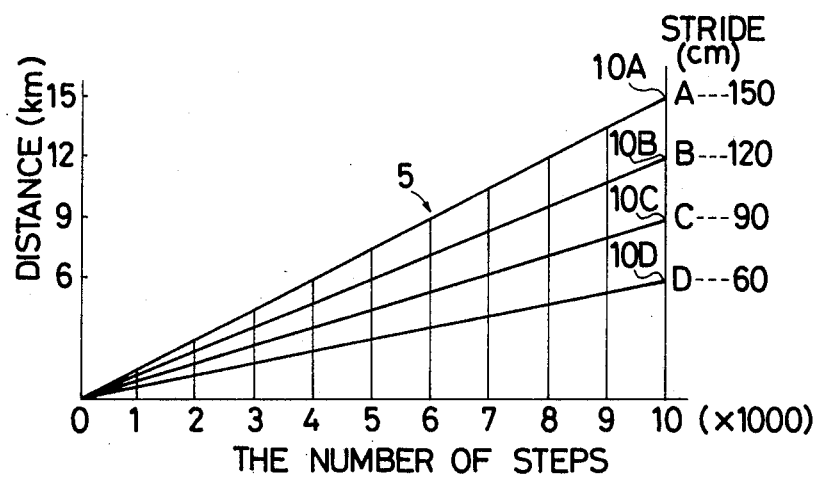
FIG. 8 is a proportional diagram showing the relation between the number of steps and the distance.
Figure 9:
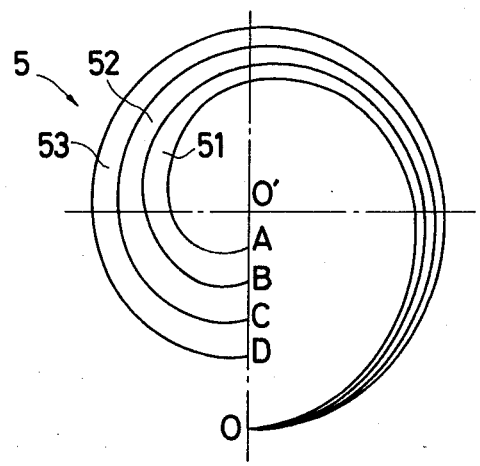
FIG. 9 is a diagram showing the same relation by curves.

The proportional diagram 5 provided on display panel 3 for indicating the relation between the number of steps and the distance is shown in FIG. 9 which is derived from FIG. 8. The procedure of FIG. 8 is as follows: take the number of steps on the axis of abscissas and the distance corresponding thereto on the axis of ordinates; then, determine points A, B, C and D corresponding to strides of 150 cm, 120 cm, 90 cm and 60 cm, respectively, on a vertical line extending from a point on the axis of abscissas, which point corresponds to $10 \times 10^3$ steps, and draw lines OA, OB, OC and OD from point 10. Thus, a given point on each of the resultant lines represents the amount of exercises, say, the distance corresponding to the number of steps and stride given. For example, intersections 10A, 10B, 10C and 10D of a vertical line extending from point 10 with respect to the above-mentioned lines represent the distances 15 km, 12 km, 9 km and 6 km, respectively, necessary for $10 \times 10^3$ steps.

FIG. 9 is obtained by rewriting these proportional lines given in FIG. 8. The diagram of FIG. 9 is then provided on the surface of display panel 3 with the central point 0' being in coincidence with the center at which the display panel 3 is supported on shaft 33. In order to permit easy discrimination of these curves ABO, BCO and COD from one another, it is advantageous that they are formed of display bands 51, 52 and 53, and that they are colored.

The viewing window 7 formed in the upper portion of the casing is provided with a transparent plate, on which a reference line 71 is scored for reading of graduations 4. The viewing window 8 in front of the casing is also provided with a similar transparent plate, on which is scored a reference line 9 having a similar relation to A, B, C and D on the proportional diagram 5. This reference line is formed with graduations 91 in kilometers and miles for indication of the amount of exercises, say, the distance.

It should be noted that the casing 6 is provided on its back with a clip 61 which is to be secured to the belt of an individual's trousers.

When an individual carrying the thus constructed pedometer participates in a marathon or takes exercises, for instance, jogging, walking, heel-and toe walking or the like, the pendulum 2 swings at every step under the action of weight 22 so that the counter mechanism operates automatically to display the number of steps on viewing window 7 on the upper portion of the casing. The distance can then be seen from reference line 9 and diagram 5 on viewing window 8. In other words, the number of steps is indicated on a point at which a corresponding graduation 4 is in agreement with the reference line 71, whereas the distance is indicated on the intersection of a corresponding curve on the diagrams with reference line 9. For instance, the distance which an individual has run with a stride of 90 cm can be read on a graduation 91 corresponding to the intersection of associated proportional line OC with reference line 9. Alternatively, the distance which an individual has ran with a stride of 105 cm can be read on a graduation 91 corresponding to the intersection of the middle of display band 52 with reference line 9.

Figure 10:
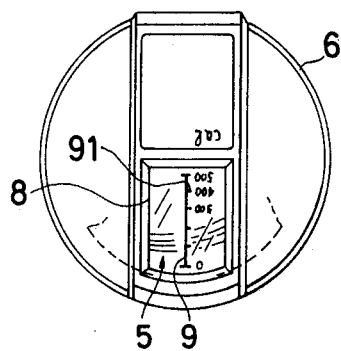
FIG. 10 is a front view of the exterior of a second embodiment of the pedometer assembly according to the present invention.
Figure 11:
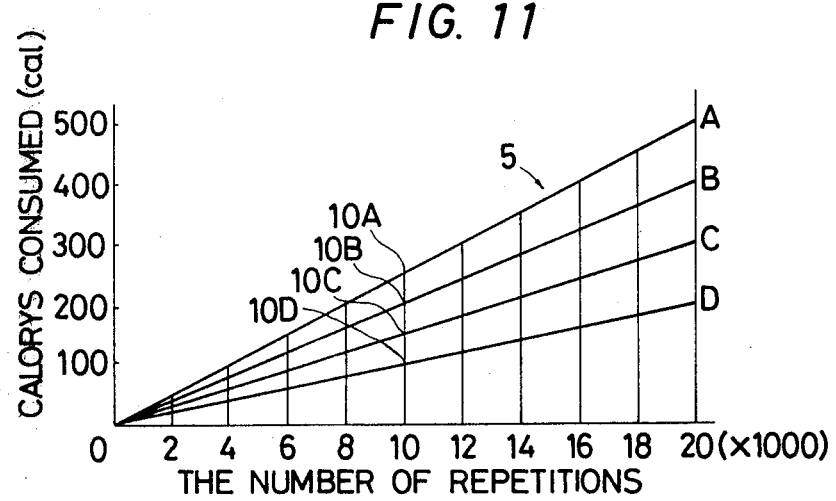
FIG. 11 is a proportional diagram for the second embodiment, showing the relation between the number of repetitions and the amount of calories consumed.

Turning now to FIGS. 10 and 11, there is shown a second embodiment of the pedometer assemblies according to the present invention. This embodiment is adapted to indicate the number of repetitions, e.g., the number of steps, skips or the like and the amount of calories consumed corresponding thereto. FIG. 10 is a front view of the exterior of the second embodiment, and FIG. 11 is a proportional diagram showing the relation between the number of repetitions and the amount of calories consumed.

The operation mechanism of this embodiment and the counter mechanism for the number of repetitions, say, the number of steps or skips which are displayed on the surface of a peripheral wall 32 of a display panel 3 are virtually the same as the first embodiment, except that a proportional diagram 9 provided in front of display panel 3. This diagram is shown in FIG. 11, which, for use, is modified as shown in FIG. 9. The procedure of this diagram is as follows: take the number of repetitions on the axis of abscissas and the amount of calories consumed, which corresponds thereto, on the axis of ordinates; then, determine points A, B, C and D on a vertical line extending from a point on the axis of abscissas corresponding to $20 \times 10^3$ repetitions, said points being equivalent to the amount of calories consumed in dependence upon the age, sex and weight of an individual, the type of exercises and the like, and draw lines OA, OB, OC and OD from point O. Thus, a given point on each of the resultant lines represents the amount of calories equivalent to the given number of repetitions, as shown in FIG. 11. For instance, intersections 10A, 10B, 10C and 10D of a vertical line extending from point 10 with respect to the above-mentioned lines represent the consumed calories, 250 cal., 200 cal., 150 cal., and 100 ca., respectively. These proportional lines are suitably modifies as shown in FIG. 9 to obtain the desired curves. The resultant diagram is provided on the surface of display panel 3 with the center O' being in coincidence with the center at which the display panel 3 is supported on a shaft 33.

As shown in FIG. 10, a transparent plate provided on viewing window 8 in front of the casing is provided with a reference line 9 having a similar relation to A to D on the diagram 5 showing the relation between the number of repetitions and the amount of calories consumed, which line is calibrated at 91 for indicating the amount of calories consumed.

When an individual carrying the thus constructed pedometer takes exercise, say, jogging, walking, rope skipping or the like, the counter mechanism operates automatically in response to the individual motion to display the number of repetitions on viewing window 7 on the upper portion of the casing. The amount of calories consumed can then been seen from reference line 9 and diagram 5 on viewing window 8. In other words, the number of repetitions such as the number as steps or skips is indicated on a point at which a corresponding graduation 4 is in agreement with the reference line 71 on viewing window 7, whereas the amount of calories consumed is indicated on the intersections of curves on the diagram 5 with reference line 9. For instance, the amount of calories which an individual with the amount of exercises being given by C has consumed can be read on a graduation 91 corresponding to the intersection of associated proportional line OC with respect to reference line 9. Alternatively, the amount of calories which an individual defined midway between B and C has consumed can be read on a graduation 91 corresponding to the intersection of the middle of display band 52 with reference line 9.

Figure 12:
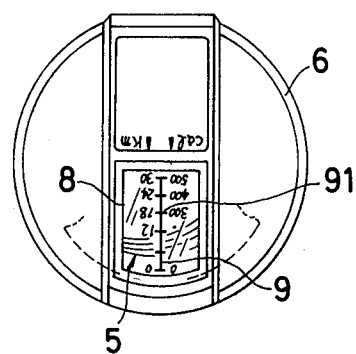
FIG. 12 is a front view of a third embodiment of the pedometer assembly according to the present invention.
Figure 13:
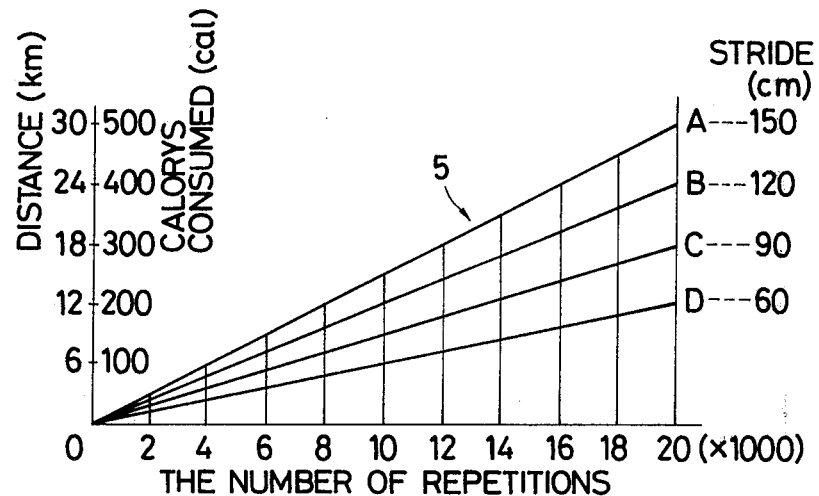
FIG. 13 is a proportional diagram for the third embodiment, showing the relation between the number of repetitions, the amount of calories consumed and the distance.

Referring now to FIGS. 12 and 13, there is shown a third embodiment of the pedometer assemblies according to the present invention. This embodiment provides a pedometer adapted to permit simultaneous indication of the distance and the amount of calories consumed. More specifically, FIG. 12 is a front view of the exterior of the pedometer, and FIG. 13 is a proportional diagram showing the relation between the number of repetitions, the amount of calories consumed and the distance. The diagram 15 provided in front of a display panel 3 is obtained from FIG. 13 modified as shown in FIG. 9. A combination of the proportional diagram of FIG. 8 with that of FIG. 11 gives a proportional diagram as shown in FIG. 13. Since the relation of the number of steps to the distance has a proportional relation to that of the number of repetitions of the amount of calories consumed. Such a proportional diagram represents the distance or the amount of calories consumed corresponding to the number of steps or the number of repetitions.

As illustrated in FIG. 12, a transparent plate provided in front of the casing is provided with a reference line 9 having a similar relation to A to D on the diagram 5 showing the relation between the number of repetitions, the amount of calories consumed and the distance, which line is calibrated at 91 for indicating the amount of calories consumed and the distance in calorie and kilometer or mile. Thus, this embodiment is more advantageous since both the amount of calories consumed and the distance can be read on a single unit.

From the foregoing, it will readily be understood that the present invention is of great practical value since the distance which has been run and the amount of energy consumed in jogging, walking, marathon or the like exercise can immediately be seen in response to the number of repetitions, e.g., the number of steps or skips.

While the present invention has been described with reference to the foregoing three embodiments; however, is should be understood that the invention may be changed or modified without departing from the scope of the appended claims.

What is claimed is:

1. A pedometer assembly adapted for use in various types of exercises such as jogging, marathon, rope skipping or the like, comprising a base disc, a pendulum adapted to swing about an axis parallel to the axis of the disc at every step, a circular display panel which is mounted coaxially with said disc and rotatable in response to swinging movement of said pendulum and which is provided at its periphery with a cylindrical wall, said wall being provided or scored on its outer surface with graduations for indicating the number of repetitions, a proportional diagram provided on the surface of said panel and adapted to indicate the relation between the number of repetitions and the amount of exercises corresponding thereto, a casing for accommodating therein the aforesaid parts, a viewing window formed for said graduations in the upper portion of said casing, a second viewing window provided for said proportional diagram in front of said casing and a reference line provided for said diagram on said second viewing window.

2. The pedometer assembly as recited in claim 1, in which said proportional diagram shows the relation between the number of repetitions and the distance which has been run.

3. The pedometer assembly as recited in claim 1, in which said proportional diagram shows the relation between the number of repetitions and the amount of calories consumed.

4. The pedometer assembly as recited in claim 1, in which said proportional diagram shows the relation between the distance and the amount of calories consumed.

5. The pedometer assembly as recited in claim 1, further comprising a shaft mounted on said disc, said pendulum being rotatably mounted thereon, a ratchet wheel and a drive gear operably associated therewith and both rotatably mounted on said shaft, a ratchet operably associated with said pendulum and engaging said ratchet wheel to incrementally drive the same in response to the pendulum swing, an intermediate gear driven by said drive gear, and a driven gear driven by said intermediate gear, said driven gear being operably connected to said display panel, thereby causing said display panel to incrementally rotate with each swing of the pendulum.

* * * * *